United States Patent
Karstens

(10) Patent No.: US 6,416,621 B1
(45) Date of Patent: Jul. 9, 2002

(54) APPARATUS, PROCESS AND PRESSURE REACTOR FOR THE TREATMENT OF SOLIDS WITH PRESSURIZED LIQUID GASES

(75) Inventor: Ties Karstens, Botzinghen (DE)

(73) Assignee: Rhodia Acetow GmbH, Freiburg (DE)

( * ) Notice: Subject to any disclaimer, the term of this patent is extended or adjusted under 35 U.S.C. 154(b) by 0 days.

(21) Appl. No.: 09/646,054
(22) PCT Filed: Mar. 9, 1999
(86) PCT No.: PCT/EP99/01517
§ 371 (c)(1), (2), (4) Date: Sep. 11, 2000
(87) PCT Pub. No.: WO99/47250
PCT Pub. Date: Sep. 23, 1999

(30) Foreign Application Priority Data

Mar. 13, 1998 (DE) .......................... 198 10 741
Jul. 21, 1998 (DE) .......................... 198 32 853

(51) Int. Cl.⁷ .............................. D21B 1/36; D21C 1/00
(52) U.S. Cl. .................. 162/22; 422/196; 422/233; 162/18
(58) Field of Search ................. 162/17, 18, 19, 162/21, 22, 41, 46, 52, 90; 127/37; 536/30, 56; 422/129, 184.1, 185, 188, 189, 191–196, 232, 233, 236–239

(56) References Cited

U.S. PATENT DOCUMENTS

| | | | | |
|---|---|---|---|---|
| 1,655,618 A | * | 1/1928 | Mason ..................... | 162/21 |
| 4,135,888 A | * | 1/1979 | Walltrip .................... | 44/1 D |
| 4,136,207 A | | 1/1979 | Bender .................... | 426/510 |
| 4,356,196 A | | 10/1982 | Hultquist ................. | 426/69 |
| 4,461,648 A | * | 7/1984 | Foody ..................... | 127/37 |
| 4,645,541 A | * | 2/1987 | DeLong ................... | 127/37 |
| 5,037,663 A | * | 8/1991 | Dale ....................... | 426/69 |
| 5,122,228 A | * | 6/1992 | Bouchette et al. ........ | 162/4 |
| 5,171,592 A | | 12/1992 | Holtzapple et al. ....... | 426/69 |
| 5,237,824 A | | 8/1993 | Pawliszyn ................ | 62/51.1 |
| 5,473,061 A | * | 12/1995 | Brederick et al. ......... | 536/59 |
| 5,769,934 A | * | 6/1998 | Ha et al. .................. | 106/162.8 |
| 5,873,372 A | * | 2/1999 | Honeycutt et al. ........ | 131/309 |
| 5,882,605 A | * | 3/1999 | Sortwell .................. | 422/135 |

FOREIGN PATENT DOCUMENTS

| | | | |
|---|---|---|---|
| DE | 523 770 | 4/1931 | |
| DE | 1 051 624 | 2/1959 | ............ D21B/1/45 |
| DE | 2 323 137 | 11/1973 | ............ B01J/3/02 |
| DE | 27 14 993 | 7/1978 | ............ D21C/7/06 |
| DE | 41 35 119 A1 | 5/1993 | ............ B01J/3/04 |
| DE | 41 14 535 C2 | 5/1996 | ............ G01N/1/28 |
| DE | 44 46 384 A1 | 6/1996 | ............ C07C/15/46 |
| DE | 196 11 416 | 9/1996 | ............ C08B/1/00 |
| DE | 196 28 277 A1 | 1/1998 | ............ C08B/15/06 |
| WO | 96/30411 | 10/1996 | ............ C08B/1/00 |
| WO | 99/47567 | 9/1999 | ............ C08B/1/00 |

* cited by examiner

Primary Examiner—Peter Chin
Assistant Examiner—Eric Hug
(74) Attorney, Agent, or Firm—Darby & Darby

(57) ABSTRACT

The invention relates to a process for the treatment of solids with pressurized liquid gases, in particular liquid ammonia, with which the to be treated solid is fed into a pressure reactor at atmospheric pressure. Subsequently the pressurized liquid gas is fed to the pressure reactor and after a pre-set dwell time the resultant liquid gas/solid mixture is expanded explosion-like into an expansion tank. With this at least two reactors are operated in a time-staggered manner. Furthermore an apparatus is described for the treatment of solids with pressurized liquid gases, which comprises at least two parallel arranged pressure reactors for the alternating taking in of a solid and a liquid gas, which each have inlet and outlet openings for the solid provided with shut-off elements as well as each at least one inlet opening for the liquid gas, at least one expansion tank which is connected to the respective pressure reactors, and conveying means for feeding the solid as well as the liquid gas.

54 Claims, 11 Drawing Sheets

APPARATUS, PROCESS AND PRESSURE REACTOR FOR THE TREATMENT OF SOLIDS WITH PRESSURIZED LIQUID GASES

The invention relates to a process, an apparatus and a pressure reactor for the treatment of solids with pressurised liquid gases, in liquid ammonia.

A process of the type is described, for example, in the WO 96/3 04 11. With the known processes polysaccharides are brought into contact with pressurised liquid ammonia. During the subsequent pressure release the volume available to the polysaccharide/liquid ammonia system is enlarged explosion-like whilst reducing the pressure by at least 5 bar. By doing so an increased accessibility and reactivity of the treated polysaccharides can be obtained.

To obtain an as high as possible yield of treated solids in a short time, such processes are preferably carried out continuously. However, with the continuous process suitable steps must be taken to feed the solid into the pressure tank.

From the DE-27 14 993 a process is known for feeding fibrous lignose cellulose raw material into a pressurised tank. Here the raw material, before entering the pressure tank, is pre-compacted to a density of at least 0,72 g/cm3 and is then fed into the tank by a conveying screw. The pre-compacted raw material then acts as a plug which on passing the inlet opening of the pressure tank seals same off, so that the pressure in the tank can be maintained. As a result thereof it is possible to continuously feed cellulose to the tank.

However, this continuous process requires a great amount of apparatus on the feeding side. In addition, due to the high pressure that must be exerted on the cellulose to compact it, a disadvantageous change of the inherent properties of the cellulose is produced.

Furthermore, the known method requires a dwell time (approx. 4 minutes) of the cellulose in the pressure tank, which is unnecessarily long especially for the treatment with pressurised liquid ammonia, in particular under high pressure, since as is known, liquid ammonia diffuses into solids within a few seconds up to one minute and in doing so is uniformly distributed.

Moreover, a reliable and adequate sealing off of the apparatus when working with liquid ammonia under pressures of up to 40 bar, in particular at the lead-through of the drive shafts for the pressure tank and for the screw conveyor in the outlet part underneath the pressure tank, is problematical. The sealing off of the pressure reactor to the outside takes place, as indicated above, by the to be treated material itself. This may possibly be satisfactory in the case of very moist, plastically deformable solids, such as for example wood chips. With cellulose, guar splits, i.e. hard, small lentil-shaped seeds, as well as with minerals, e.g. zeolites or silicates, as solid, a sealing is, however, hardly possible.

Finally, the smallest possible size of the apparatus for carrying out the known process lies at a through-put of approximately 400 tons per year, which is much too large for specific fields of application.

From the U.S. Pat. No. 5,171,592 a process is known, with which the to be treated biomass is pressed by means of a solids pump against a large valve so as to compact the material and press out the enclosed air before the valve is opened to feed the biomass into the reactor. The reactor is provided with finger-like teeth on the inside wall of the reactor and on a rotating tool. The teeth have a hole for dosing liquid ammonia into the reactor. The reactor outlet is provided with a valve through which the ammonia-treated biomass can escape explosion-like into a collecting tank. The apparatus for carrying out the process is, therefore, relatively complex and not suitable for processes that are carried out under high pressure, seeing that rotating machine parts are located in the high-pressure area, which causes increased wear and susceptibility to problems of the known apparatus.

It is, therefore, the object of the present invention to indicate a process with which the described disadvantages of the state of the art are avoided, and with which at the same time the treated solid is obtained practically continuously. It is a further object of the invention to make available an apparatus suitable for carrying out the process and a respective pressure reactor, which stand out by a high availability and low maintenance costs.

These objects are achieved by the process for the treatment of solids with pressurised liquid gases, in particular liquid ammonia, according to claim 1, by the apparatus according to claim 10 and by the pressure reactor according to claim 45 or the process according to claim 55.

According to same, with the process according to the invention the to be treated solid is fed into a pressure reactor at atmospheric pressure, subsequent to which the pressurised liquid gas is fed to the pressure reactor and after a pre-set dwell time the resultant liquid gas/solid mixture is expanded explosion-like into an expansion tank, wherein at least two reactors are operated in a time-staggered manner.

With the process according to the invention it is possible to feed a pressurised liquid gas into a solid present in any form, and to treat it with the pressurised liquid gas for a pre-set time, without a drop in pressure occurring and without the to be treated solid itself being used for sealing functions so as to maintain the pressure. For this reason, at the start of the process the to be treated solid need not be compacted so heavily that its structure or morphology changes or is adversely affected. Accordingly, a rapid and uniform diffusion of the pressurised liquid gas in the to be treated solid is ensured.

At the start of the process according to the invention, in particular after a preceding preparation in the sense of a splitting up or comminuting, the to be treated solid can be pre-compacted to a desired bulk density or to a specific compacting degree. In this way the yield of treated solid per unit of space and time can be adapted to the requirements in question, for example with regard to the size of the apparatus. In this connection it must be borne in mind, however, that the compacting pressure is kept so low that no change in the inherent properties of the solid occurs.

The process according to the invention can be used for the treatment of cellulose, starch, gelatine, guar or wood chips and in general of polysaccharide-containing materials, but also for the treatment of minerals such as silicates and zeolites as well as of thermoplastic polymers. Because of its particularly good diffusion properties, ammonia has proved eminently suitable for use as liquid gas.

By the cyclic operation of at least two pressure reactors, a quasi-continuous treatment of the solid can be obtained, so that starting material can be made available practically uninterruptedly for further processing.

Preferably, the gas released during the explosion-like pressure release is recovered. The recovered gas can subsequently be fed back to the process in liquid form. This permits a particularly economic mode of operation, as in total only a small part of the used gas, which for example escapes into the atmosphere by unavoidable diffusion or evaporation, need be replaced.

The solid can be fed into the pressure reactor with the aid of dosing screws. By using this known, technically perfected conveying means, the process according to the invention can be implemented particularly reliably.

Alternatively, the solid can also be fed into the pressure reactor by a pneumatically operating conveying device. By this measure a particularly quick and specific feeding of the to be treated solid can be achieved.

Preferably, the to be treated solid is actively mixed with the liquid gas in the pressure reactor. This has the advantage that the liquid gas penetrates even more deeply into the solid and distributes itself even more homogeneously in same. Furthermore, by this additional measure the dwell time of the mixture liquid gas/solid in the reactor can be reduced and accordingly the throughput per pressure reactor can be increased. This measure is particularly expedient when the liquid gas has only moderately good diffusion properties or when a particularly high activation of the to be treated solid is required.

According to a preferred embodiment the opening and closing of the reactors and/or the feeding of the solid and/or of the liquid gas is controlled automatically. By combining the mentioned measures the entire process can practically be automated, so that the operating personnel only has to attend to monitoring and possibly maintenance duties of the apparatus.

If desired, together with the pressurised liquid gas a solid or liquid additive dissolved or dispersed therein can be fed into the reactor. In this way, together with the treatment with liquid gas, the solid can be dosed with other substances, for example to further increase its activation. In this case preferably ammonia is used as liquid gas, as numerous additives can easily be dissolved in same.

The liquid gas is preferably mixed with the solid or liquid additive before it enters the reactor. By doing so, a homogeneous solution or dispersion of the additive and the liquid gas can be produced.

The apparatus according to the invention for the treatment of solids with pressurised liquid gas comprises at least two parallel arranged pressure reactors for the alternating taking in of a solid and a liquid gas, which each have inlet and outlet openings for the solid provided with shut-off elements as well as each at least one inlet opening for the liquid gas, at least one expansion tank which is connected to the respective pressure reactors, and conveying means for feeding the solid as well as the liquid gas.

With the apparatus according to the invention a quasi-continuous operation during the treatment of a solid with pressurised liquid gas can be realised. The inside of the reactor can be sealed off from the atmosphere in a simple manner by the shut-off elements, so that no complex structural or process-technical measures are required to maintain the pressure during the carrying out of the process.

The shut-off elements of the pressure reactors preferably are ball valves. These have the advantage that they are technically matured and tested. They can be used for millions of cycles without material fatigue symptoms occurring. Accordingly, at an assumed cycle time of 1 minute and 8000 operating hours per year, the valves need not be replaced for several years. Also, special valves of ceramic or with hardened surfaces are commercially obtainable, which withstand particularly high stresses.

According to a specially preferred embodiment, the pressure reactors are upright tubular cylinders. In this way the filling with comminuted and pourable solids is facilitated, as here the force of gravity aids the feeding in of the solid. These tubular cylinders can be manufactured particularly easily and their number can be chosen in accordance with the optimum dwell time for the to be treated solids. The cycle frequency and accordingly the number of tubular cylinders to be used depends, therefore, on the filling time of each tubular cylinder. At an assumed filling time of approximately one minute, for example, with eight cylinders which each have a capacity of 8 kg, a throughput of 2,4 tons/hour can be obtained. To avoid material losses during the filling, the inlet of the reactor may be widened upwards in the form of a hopper.

Depending on whether a technically particularly simple solution is desired for feeding the solid or whether above all a high feeding speed is required, conveying screws or pneumatic conveyors can be chosen as conveying means for the solid.

As has already been mentioned, means can be provided for the automated control of the process operations, in particular the feeding of the solid and/or the liquid gas and/or the cyclic actuation of the shut-off elements of the pressure reactor.

According to another advantageous embodiment, the pressure reactors are equipped with external heating. By means thereof, in conjunction with a suitable regulating, a constant temperature can be ensured inside each reactor.

The reactors preferably have several openings each for the feeding in of the liquid gas. In this way the liquid gas can be distributed particularly finely over the entire inside of the reactor and accordingly over the surface of the solid.

With a view to a better distribution of the liquid gas over the solid or into the inside of same, the reactors may also be designed as mixers. In this case, however, technically complicated measures must be provided for a secure sealing off of the reactor.

As will still be explained in greater detail in the following, the shut-off elements at the inlet of each pressure reactor may be designed as a sluice system. By doing so the impermeability of the reactor can be additionally increased or secured.

The apparatus according to the invention preferably comprises a compacting device, which compacts the solid, in particular cellulose, in the pressure reactor. By compacting the comminuted cellulose in the pressure reactor, a higher space/time yield and, accordingly, comparatively smaller apparatus sizes can be achieved. By compacting the solid, e.g. the comminuted cellulose, to a specific pressing effect or filling degree, a filling of the pressure reactor is advantageously obtained within relatively narrow limits. A complicated and expensive gravimetric dosing system can, therefore, fall away.

The compacting device preferably has a compacting piston, which moves in a cylindrical reactor chamber (34, 50; 81) or dosing chamber and compacts the solid. By means of the piston a gentle compacting of the solid is obtained.

The compacting piston preferably has one or several ducts which extend liquidpassable from an underside to an upper side of the compacting piston. By the perforation of the piston disturbing propellant gas can escape from the reaction chamber during the compacting and an accurately reproducible filling degree of the solid is obtained.

The compacting piston preferably moves the compacted solid from a compacting chamber into a reaction chamber of the pressure reactor. As a result thereof extra means for charging the reaction chamber can be dispensed with.

The compacting piston preferably can be locked or at least held in a position of its maximum piston stroke, as a result of which additional shut-off means for the separation between compacting and reaction operation can be dispensed with. Furthermore, by doing so different filling levels and filling volumes of the solid in the reactor chamber can be realised.

Preferably, a solids feeding device is provided which feeds the solid to a pressure reactor or a group of pressure reactors, wherein the solids feeding device has a conveying propeller which ensures a continuous feeding of the solid.

Preferably, a preparation device is provided for the solid, which prepares the solid before it is fed to the pressure reactor or the pressure reactors, as a result of which the reaction time in the pressure reactor is reduced. Preferably, as preparation device a heating device is used which heats the solid.

Preferably, a heat carrier fluid, which is heated by the heating device, is fed to the solid as a result of which a homogeneous heating of the solid during the preparation is ensured.

Preferably, liquid or gaseous ammonia is used as heat carrier fluid, as a result of which the absorption of liquid ammonia in the pressure reactor is improved further and even shorter reaction times are obtained.

Preferably, the heating device heats the ammonia to a temperature of approximately 100° C., by which favourable conditions are produced for the ammonia absorption in the pressure reactor.

Preferably, the heat carrier fluid circulates in a heating circuit, by which energy and fluid are saved.

Preferably, the solid is heated in a conveying screw, by which an accurate reaction time of the heat carrier fluid on the solid and accordingly a constant and accurate heating of the solid can be realised.

The process according to the invention preferably comprises the following pressure reactor phases, wherein a pressure reactor is charged with a solid during a filling phase, wherein subsequently during a compacting phase the solid is compacted in the pressure reactor, wherein then during a reaction phase liquid gas is fed into the compacted solid in the pressure reactor, by which a liquid/solid mixture is produced, and wherein then the liquid/solid mixture is expanded explosion-like into an expansion tank. By the compacting step, so to speak a uniform, accurate and cost-saving dosing of the solid and an economical operation can be obtained due to a high space/time yield, compared to processes without compacting step.

As liquid gas, a mixture of ammonia and urea may, for example, be fed to the cellulose in the pressure reactor, so as to produce cellulose carbamate with the process according to the invention, the apparatus according to the invention and the pressure reactor according to the invention, respectively.

Still before be reaction phase, the filling phase and the subsequent compacting phase of the solid in the pressure reactor can be repeated one or several times, to obtain a pre-set compacting degree and/or filling level of the solid in the pressure reactor.

Several pressure reactors can be operated simultaneously, time staggered, in the aforementioned phases, so as to obtain a quasi-continuous process with a high yield.

The pressure reactor according to the invention for the treatment of a solid, in particular cellulose, with a pressurised gas or a liquid, in particular liquid ammonia, optionally together with urea, comprises a compacting device which presses together the solid filled into the pressure reactor so as to compact it, by which the advantages already indicated above are obtained.

The process according to the invention for the treatment of a solid, in particular cellulose, with a pressurised gas or a liquid, in particular liquid ammonia, is carried out with the following steps: a pressure reactor is filled with a solid during a filling phase, subsequently during a compacting phase the solid is compacted in the pressure reactor, then during a reaction phase the gas or the liquid is fed to the compacted solid in the pressure reactor, by which a liquid/solid mixture or gas/solid mixture is produced, and then the mixture is expanded explosion-like into an expansion tank.

Further advantageous further developments of the present invention can be noted from the sub-claims.

Further advantages, advantageous further developments and application possibilities of the present invention can be noted from the following description of embodiments with reference to the attached drawings, wherein.

Figure 1:
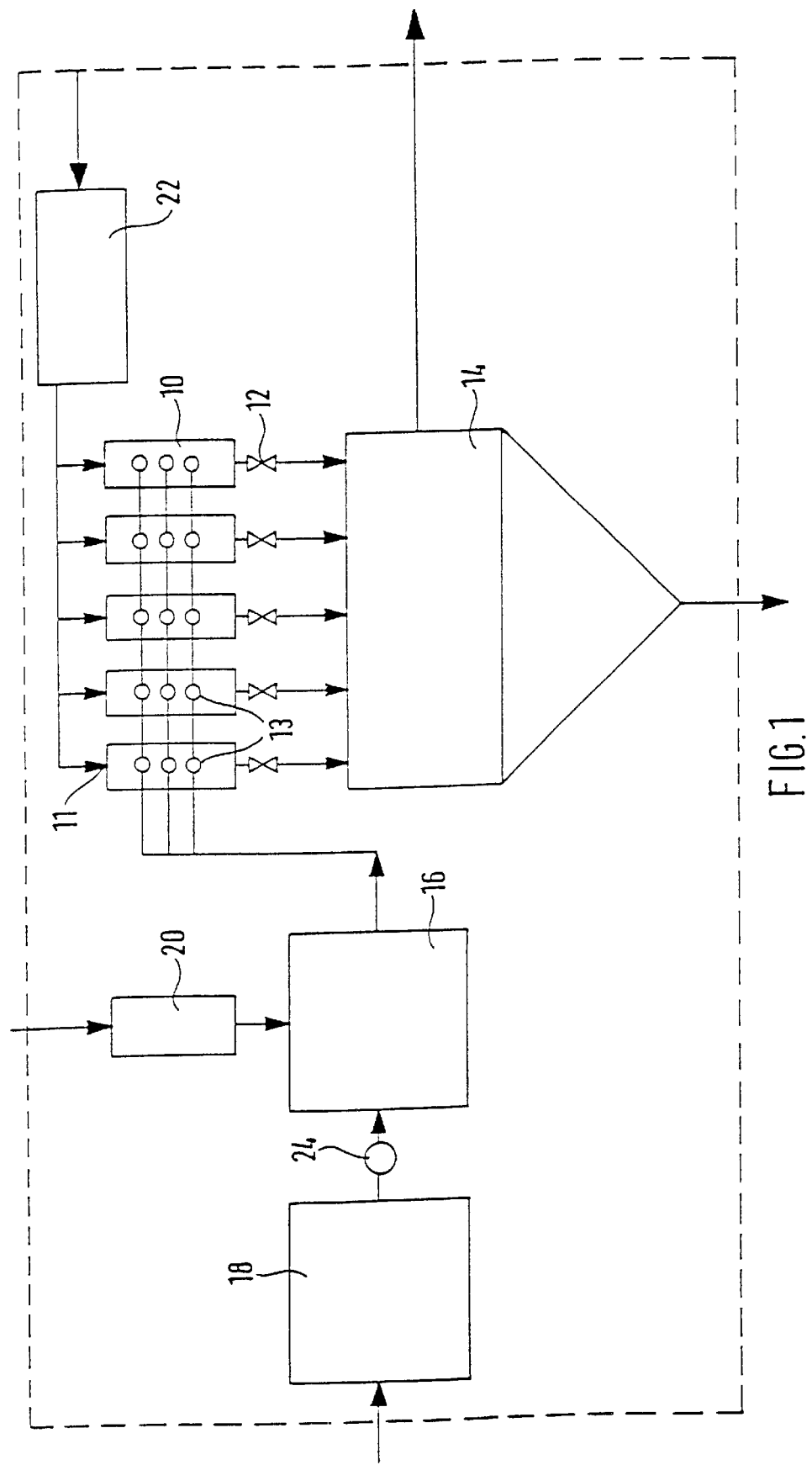
FIG. 1 shows a flow diagram of the process according to the invention.

As can be noted from FIG. 1, the solid to be treated, e.g. cellulose, is fed to the pressure reactors 10 (in the present case five parallel reactors) the one after the other by a conveying means 22. After their respective filling the pressure reactors 10 are closed at their inlet. Liquid gas, here liquid ammonia, is fed by a conveying means 18 and a pump 24 to a mixer 16. In the present case in addition an additive, e.g. urea, is fed to the mixer by a conveying means 20, which additive is mixed with the liquid ammonia. From the mixer 16 the NH3/urea mixture is fed by suitable conveying means to the pressure reactors 10. After a specific dwell time during which the NH3/urea mixture is mixed with the cellulose in the pressure reactors 10, the shut-off element 12 at the outlet of each pressure reactor 10 is opened, so that the NH3/urea/cellulose mixture present in the pressure reactor is expanded explosion-like into the expansion tank 14. The gaseous NH3 released during this expansion is fed to suitable washers and condensers for recovery purposes. The activated cellulose can now be discharged from the outlet of the expansion tank.

As can be seen, the core part of the apparatus consists of a pressure reactor 10, which can be made standing upright with at the top and bottom a shut-off element 11 and 12 respectively, which may for example be valves. As a result thereof, on the one hand a simple filling with the to be treated solid is made possible, and on the other hand the rapid expansion after the treatment with pressurised liquid gas. To feed in the liquid gas, in this case three openings 13 each are provided, so that a uniform penetration of the to be treated solid is ensured.

For use in the apparatus according to the invention any type of shut-off element which has a pressure resistance of Up to approximately 40 bar is suitable, e.g. ball valves, segment ball valves, flap valves, rotating slide valves or the like can be used.

Also so-called sluice systems, i.e. two ball valves arranged in tandem, can be used as shut-off elements. With this the first ball valve is always in contact with the product (and as a result thereof may in the course of time possibly lose its pressure stability), whereas the second ball valve does not come in contact with the product and, therefore, should have a lower leakage rate. Furthermore, it is possible to construct the pressure reactor 10 as a mixer. In this case the shut-off elements at the inlet and outlet must be designed in such a way that the rotating of the mixing device will not endanger the impermeability of the reactor.

The pressure reactor 10 is equipped with a (not illustrated) external heating, which permits an increased temperature in the pressure reactor 10 and in addition compensates the drop in temperature after the rapid expansion into the expansion tank 14.

The filling of the pressure reactor 10 with the solid expediently takes place by means of dosing scales and dosing screws, wherein the time for the filling operation must be kept as a short as possible. Because of the high conveying capacity a technically more complicated, pneumatically operating filling device with suitable shunts for the specific feeding of the solid may be preferred. In this case care must be taken, however, that an accurate dosing of the conveyed quantity of solid is ensured. In addition, the transport of the solid into a storage tank, e.g. by screw conveyors, the sealing off of this storage tank from the atmosphere and a supply of compressed ammonia gas for the pneumatic conveying must be ensured.

Figure 2:
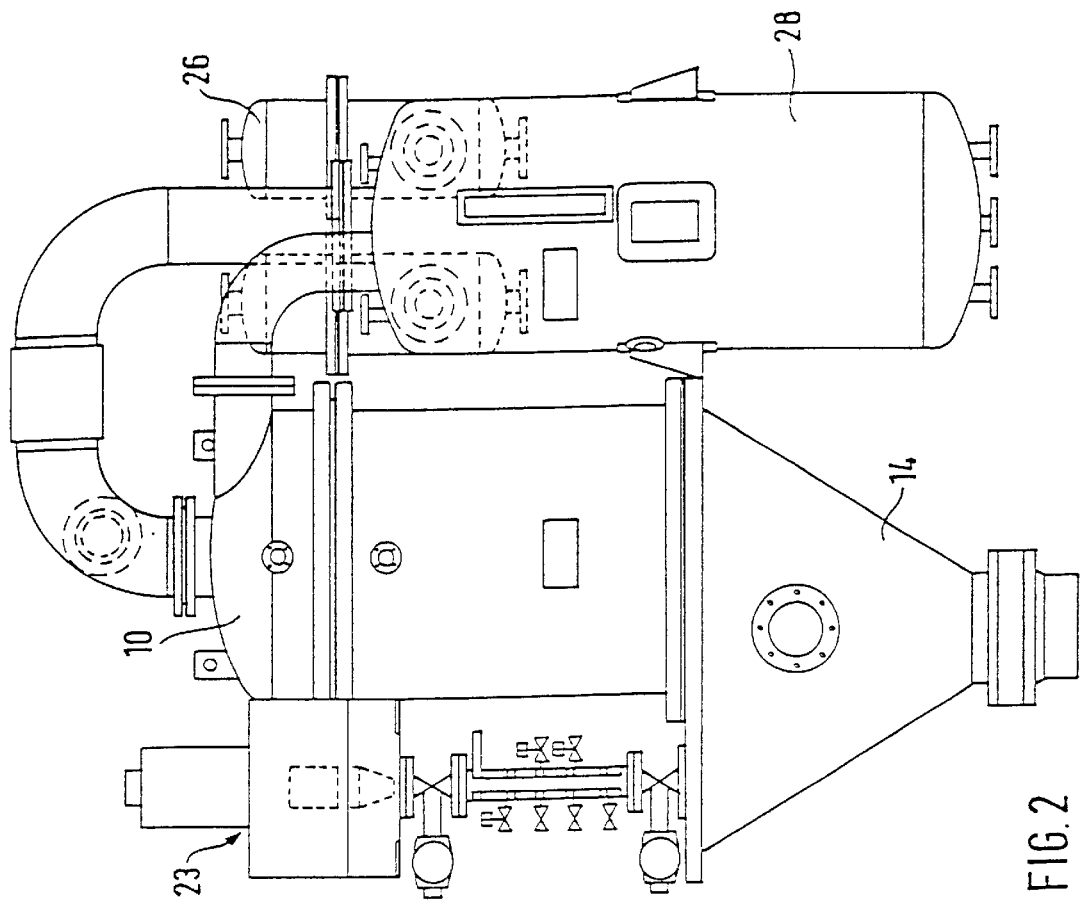
FIG. 2 is a diagrammatic view of the apparatus for carrying out the process according to FIG. 1, with a pressure reactor with dosing scale.
Figure 3:
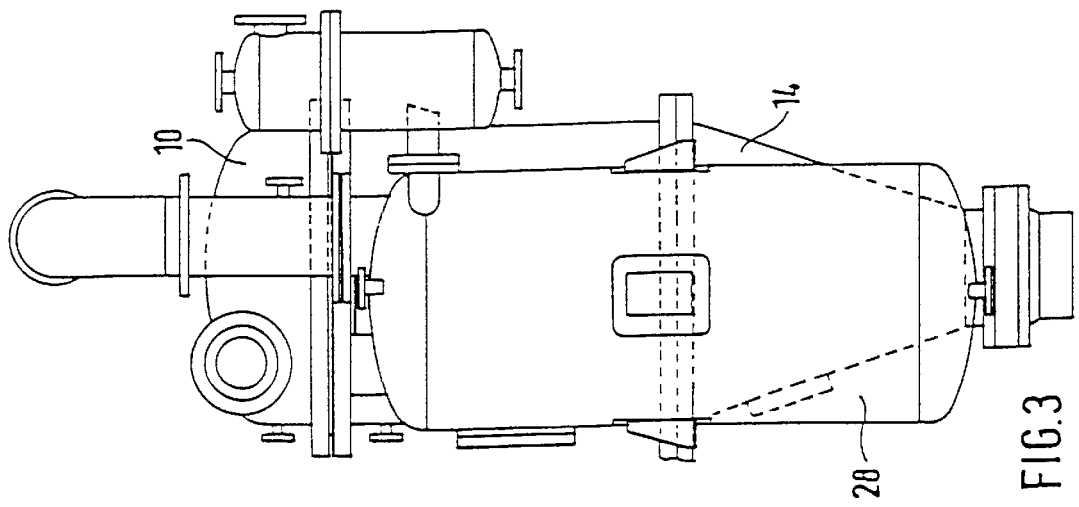
FIG. 3 is a side view of the apparatus of FIG. 2.
Figure 4:
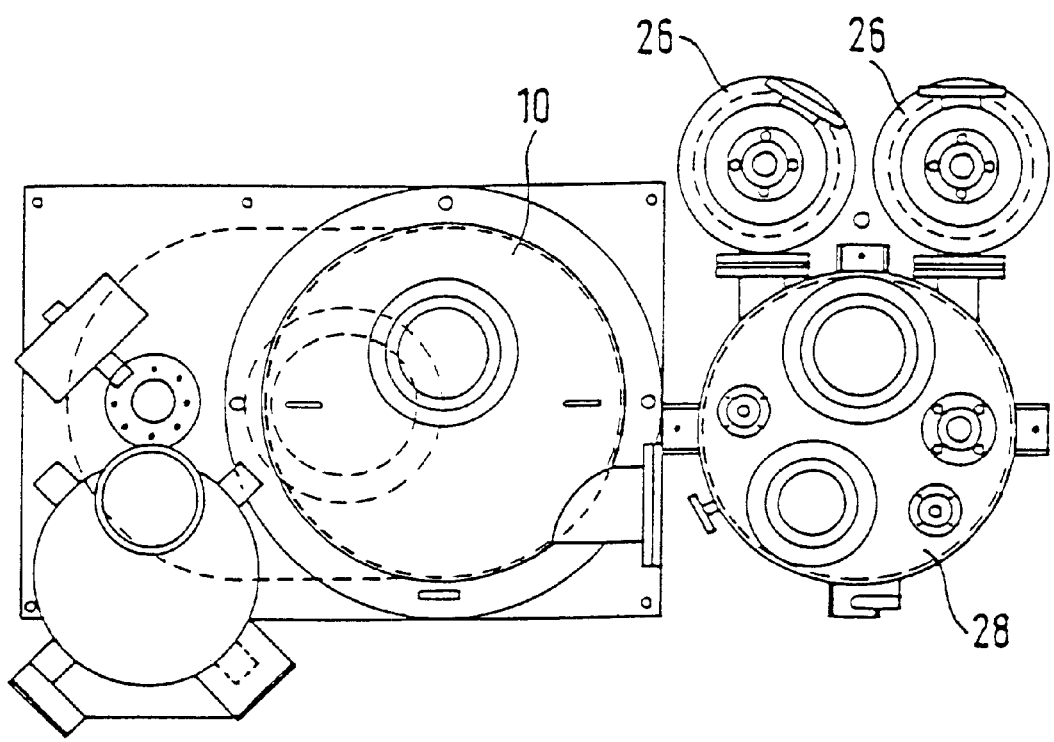
FIG. 4 is a top view onto the apparatus of FIG. 2.

In FIGS. 2 to 4 the main elements of the apparatus according to the invention for the carrying out of the described process are illustrated in various views.

The individual tanks are fastened in a suitable manner on a supporting structure, preferably of steel, and comprise the pressure reactors 10 (in FIGS. 2 to 4 only one single one can be seen), the expansion tank 14, washers 26 and an absorber 28 for recovering the ammonia. The steel structure is preferably walkable. Auxiliary units, such as for example pumps, cooler compressors, are arranged underneath the apparatus. The control, regulating units and the computer are not illustrated here. These elements can be installed separately from the apparatus, e.g. in a room next door. In this way the operating personnel, in order to monitor the process, need not be in the direct vicinity of the apparatus and will therefore be better protected against excessive noise.

The expansion tank 14 consists of three parts that are screwed together with in the present case a capacity of approximately 900 liters. In FIG. 2 at the right above the expansion tank 14, the mounting for the explosion ball valve and the pressure reactor 10 built onto same are illustrated. On the left side above the expansion tank 14 a frame is fastened, on which a cellulose dosing scale 23 is provided. The bottom part of the expansion tank 14 tapers down conically towards its end. In the present case a shut-off valve is provided for discharging the cellulose. A slide system with a silicone seal ensures that during the emptying of the treated cellulose no ammonia can escape from the expansion tank 14.

In the upper part of the expansion tank 14 a removable screen plate is provided, so that no cellulose will get into the absorber 28. Both in front of and behind this screen plate, a pressure measuring device is provided, by which the difference in pressure is determined. An increase in the difference in pressure informs the operating personnel that the screen is clogged.

At the upper end of the expansion tank 14 two pipe connections are provided, to each of which a pipe leading to the absorber 28 is connected. The pipes coming from the expansion tank are passed into the inside of the absorber 28 by dip pipes. In the present case the absorber has a capacity of approximately 680 liters and is in the usual way provided with a filling level viewing glass, so that it can be ascertained how far the dip pipes project into the water present in the absorber.

In addition the absorber 28 may have an electric filling level probe as well as a temperature gauge. At the bottom of the absorber 28 several outlets are provided, two of which are connected by a pump to a flow cooler with flow meter, so as to circulate the absorber water and keep it at a temperature of approximately 20° C. Through a top connection fresh water can be fed in manually to replace used water. The used water is drained off by hand through a third pipe connection at the bottom. By the two top rewards directed outlet connections of the absorber, same is connected by flange connections to the washers 26, which in the present case have a volume of approximately 40 liters each.

The air from the absorber is pre-washed in the washers 26 before it is let off into the atmosphere. The washing of the waste air takes place in the known manner by spraying jets, which are supplied by way of a flow cooler with automatic topping up.

The gas required for the process is stored in a storage tank, e.g. an ammonia cylinder, which is arranged on a dosing scale and is connected to a regulating unit.

In the present case the reactor has a volume of approximately 1, 2 liters and is heated to the desired temperature on two opposite sides over its entire length by means of a heat exchanger. If as liquid gas ammonia is used, then a reactor temperature of approximately 80° C. has proved particularly suitable.

In addition, a chemical pressure gauge may be provided in the main pipe to control the pressure of the liquid gas, a valve for venting the absorber as well as one or several safety valves in suitable places. To feed the liquid gas into the reactor 10, preferably precision dosing valves are used.

The cellulose dosing scale 23 stands above the expansion tank 14 and is equipped with a storage tank and a double screw. It is controlled by a SPS-control unit and the already mentioned regulating unit.

The ball valves, shut-off valves, precision dosing valves and the other valves are controlled pneumatically by way of the SPS control unit which is connected to a computer. They are provided in the usual manner with position indicators for the SPS control unit. The pressure on the pneumatic valves is kept constant by a compressor. The control system consists of two control and regulating circuits, the SPS control unit (e.g. Sematic Step 5) and a computer with Intouch software as user interface. By way of the input unit of the computer, in addition the control of the overall apparatus takes place. Furthermore, suitable indicating devices are provided, by which among others all alarms are indicated.

With the invention a process and an apparatus suitable for same are made available, by which a pressurised liquid gas, preferably liquid ammonia, can be to a solid in any form whatsoever. This solid is kept in contact with the pressurised liquid ammonia for a pre-determined period, without a drop in pressure occurring in the reactor and without the to be treated material itself having to be used to maintain the pressure, seeing that the reactor is filled at atmospheric pressure. For this reason the morphology of the to be treated solid is not changed or adversely affected. In addition the rapid and uniform diffusion of the pressurised liquid ammonia ensures a homogeneous distribution of same into the to be treated solid and accordingly, as a result thereof, a uniform activation of the solid.

The process according to the invention and the apparatus indicated for carrying out the process are particularly suitable for the treatment of cellulose, starch, gelatine, guar or wood chips and in general polysaccharide-containing materials. Furthermore it can be used, for example, with minerals, e.g. silicates and zeolites, as well as possibly thermoplastic polymers as the solid.

Figure 5:
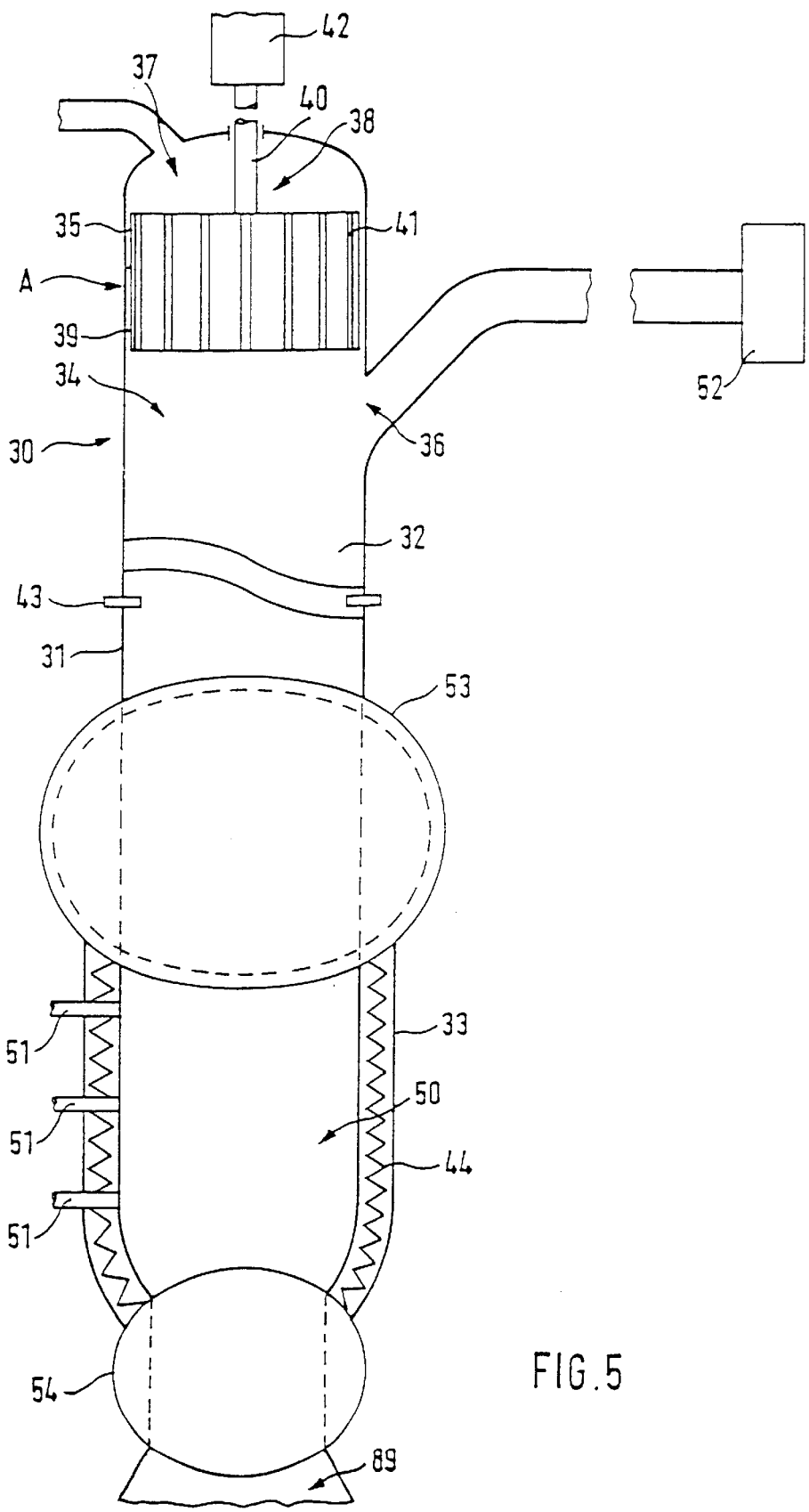
FIG. 5 is a diagrammatic view of the pressure reactor according to the invention according to a first embodiment for use in the apparatus according to get invention.

FIG. 5 illustrates diagrammatically a pressure reactor according to a first embodiment for use in the apparatus according to the invention.

The pressure reactor 30 comprises a compacting device, a pressure reactor tank 31, at least one solids inlet 36 and at least one conveying means outlet 37 for a solids conveying means and is divided with regard to function into at least one compacting section 32 and a reaction section 33, wherein the two sections can be separated from one another by means of a separating device, e.g. a ball valve, a flap valve or a sluice.

The pressure reactor tank 31 has a substantially cylindrical shape and is arranged vertically. In the upper part the pressure reactor tank 31 comprises the compacting section 32 and in the bottom part the reaction section 33, which adjoins the compacting section 32.

The compacting section 32 comprises essentially a compacting chamber 34, a compacting device 35, the solids inlet 36 through which the solid can be fed into the compacting chamber 34, and a conveying means outlet 37, through which a conveying means, e.g. gas, air or nitrogen or the like, by which the solid is charged via the solids inlet 36 into the compacting chamber, is again removed from the compacting chamber 34.

The compacting device 35 comprises a compactor 38 and a compactor drive unit 42, which is coupled to the compactor 38 and drives the compactor 38. The compactor 38 compacts or compresses or presses together the solid which is present, for example, as torn pulp, i.e. as a relatively coarsely torn cellulose, in the compacting chamber 34 of the pressure reactor 30.

The compactor 38 illustrated in FIG. 5 comprises a compacting piston 39 and a compacting rod 40 which is connected to the compacting piston 39. The diameter of the compacting piston 39 fits the cross-sectional inside diameter of the compacting chamber 34 of the reactor tank 31 and is arranged vertically inside the compacting chamber 34 and also Up into a reaction chamber 50 of the reaction section 33, movable upwards and downwards. The compacting piston 39 has an upper side and an underside, wherein the upper side points to the conveying means outlet 37 and the underside to an expansion tank 89. Between the upper side and the underside of the compacting piston there extend several liquid-passable ducts, which provide a liquid-passable connection for the gaseous conveying means from the underside to the upper side of the compacting piston 39 to the conveying means outlet 37.

Connected to the upper side of the compacting piston 39 is the compacting rod 40, which in turn is moved by the compactor drive unit 42 and transfers its movement to the compacting piston 39. The compactor drive unit 42 comprises a pneumatic cylinder, which is connected to a suitable pneumatic system. The compactor drive unit 42 may, however, also be designed as a hydraulic system, or as a mechanical system driven by an electric motor.

In FIG. 5 the compacting piston 39 is shown in its starting or rest position A, which it generally assumes when the compacting chamber 34 is charged with solid through the solids inlet 36. The rest position A of the compacting piston 39 generally corresponds to the vertically seen uppermost position which the compacting piston 39 can assume.

Arranged on the compacting chamber 34 is a sensor device 43, which is provided for checking a compacting degree or the density of the solid during the compacting operation and/or the filling level of the solid in the compacting chamber 34. The sensor device 43 has one or several sensors, which for example are based on light optical or radioactive principles. As sensor, for example a β-sensor with suitable detector can be used.

The solids inlet 36 is connected in a pass-through manner to a solids transport system or a solids conveying device, which feeds the solid to the pressure reactor 30. As solid, for example, cellulose is used here in the form of torn pulp. However, also guar splits or another granular solid or a solids mixture can be used. The solids conveying device conveys the cellulose or solid pneumatically, i.e. using air or nitrogen or a similar gas as conveying means. The conveying means which during the filling of the compacting chamber 34 gets into the compacting chamber 34 together with the solid through the solids inlet 36, escapes from the compacting chamber 34 or the inside of the pressure reactor through the conveying means outlet 37. To this end the conveying means outlet 37 is connected liquid-passable to a feedback device 96 (see FIG. 14), which feeds the conveying means, e.g. air, from the inside or the reactor chamber of the pressure reactor back again into the cellulose conveying device, to establish a closed conveying means circuit.

Between the compacting section 32 and the reaction section 33 of the pressure reactor 30 a shutoff device 53 or separating device is provided, which in the open position permits a liquid-passable and solids-passable connection between the compacting section 32 and the reaction section 33 of the pressure reactor 30, and in the closed position separates the compacting section 32 from the reaction section 33 in an impenetrable manner. The shut-off device 53 is indicated diagrammatically in FIG. 5 as a ball valve. However, it may also be a flap type closing device or, for example, be designed as a sluice system or double sluice system or the like, to produce in any case a secure separation between the compacting section 32 and the reaction section 33.

The reaction section 33 of the pressure reactor 30 has a cylindrical reaction chamber 50, the inside diameter of which corresponds to the diameter of the compacting chamber 34. In the wall of the reaction chamber 50 several ammonia inlets 51 are provided, through which liquid ammonia can be fed into the reaction chamber 50. Several ammonia inlets 51, in FIG. 5 three are illustrated, are provided to ensure a homogeneous charging of the reaction chamber 50 during the cellulose filling. In or on the wall of the reaction chamber 50 a heating device 44 is arranged. As mentioned, the reaction chamber can be closed or opened at the top by the ball valve, and at the bottom, i.e. towards the expansion chamber 89 it can be closed off or opened by a further shut-off device 54, e.g. a ball valve, a flap sluice or the like, to permit an expanding of the cellulose/ammonia mixture of the reaction chamber 50 into the expansion chamber when the ball valve is open. The reaction chamber 50 is, therefore, separated from the expansion chamber 89 when the shutoff device 54 is closed, or is connected to the expansion chamber liquid-passable or solids-passable when the shut-off device 54 is open.

Figure 6:
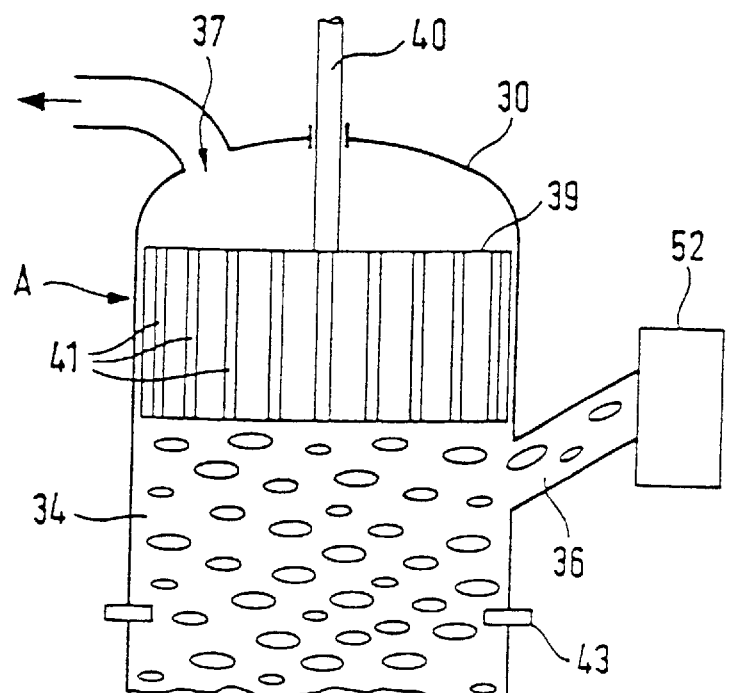
FIG. 6 is a diagrammatic view of the pressure reactor of FIG. 5 to explain a filling phase of the pressure reactor.
Figure 7:
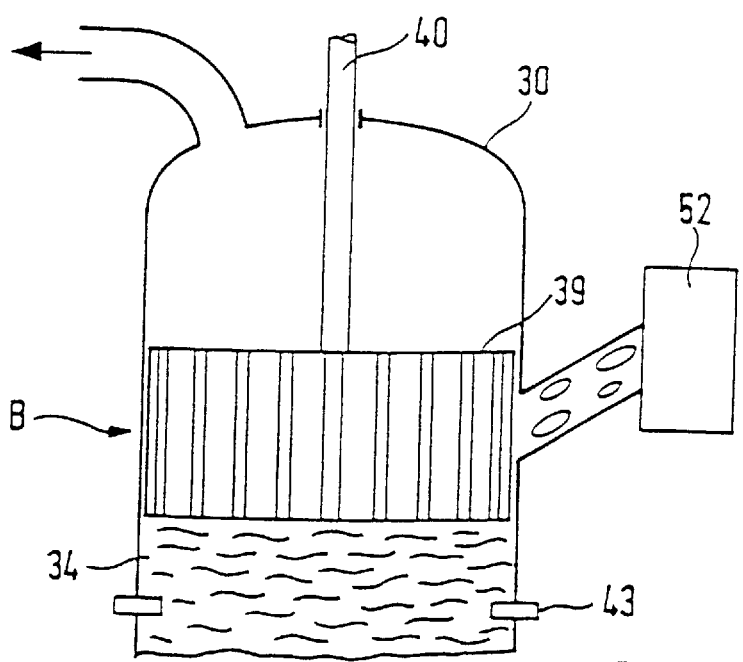
FIG. 7 is a diagrammatic view of the pressure reactor of FIG. 5 to explain a compacting phase of the pressure reactor.
Figure 8:
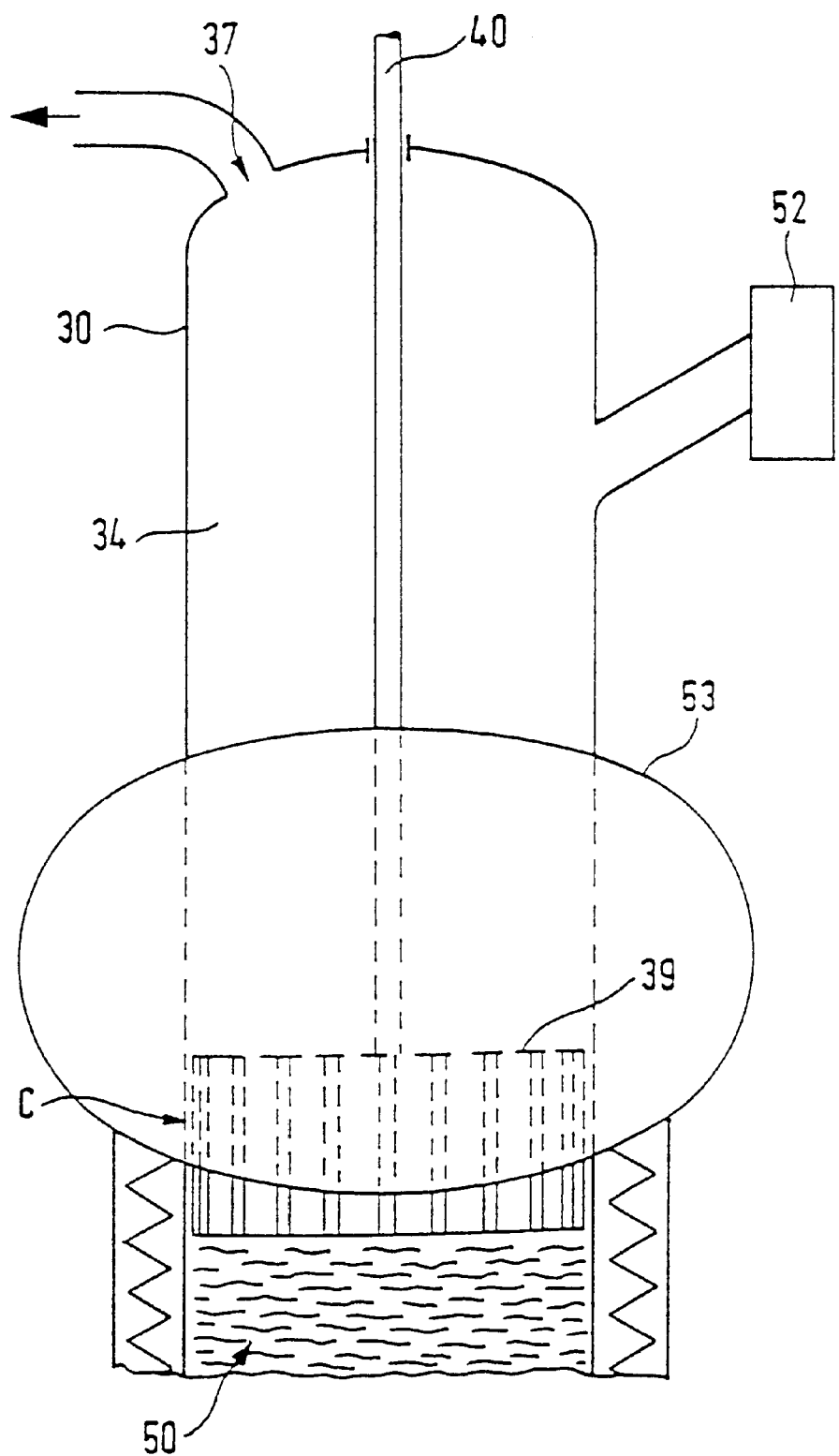
FIG. 8 is a diagrammatic view of the pressure reactor of FIG. 5 to explain a discharge phase of the pressure reactor.

In the following the mode of operation of the pressure reactor of FIG. 5 will be explained with reference to FIGS. 6, 7 and 8, which illustrate various phases or cycles of the pressure reactor operation, so as to describe the process according to the invention. Thus, FIG. 6 illustrates a filling phase during which the compacting piston 39 is in its uppermost position inside the compacting chamber 34, i.e. in a rest position A. FIG. 7 shows a typical compacting phase, during which the compacting piston 39 compacts or presses together the solid in the compacting chamber 34. Finally, FIG. 8 shows a discharge phase during which, after completing the filling and compacting of the solid in the pressure reactor 30, the compacting piston 39 pushes the compacted solid from the compacting chamber 34 through the opened shut-off device 53 into the reaction chamber 50 of the pressure reactor 30, the compacting piston 39 being positioned in a discharge position C for the compacted solid from the compacting chamber 34 into the reaction chamber 50.

As illustrated in FIG. 6, at the beginning of a filling operation of the pressure reactor 30, the compacting piston 39 is in its rest position A or pulled back position A, whereas the solids feeding device through an opened feed valve 52 and the solids inlet 36 charges the compacting chamber 34 of the pressure reactor 30 with solid, in the present case cellulose in the form of torn pulp, wherein as conveying means compressed air is used. The air which during the filling gets into the compacting chamber 34 escape through the ducts 34 or the perforation of the compacting piston 39 to the upper conveying means outlet 37 into the conveying means circuit. During the filling the shut-off device 53 of the pressure reactor 30 is closed. During the filling phase a central control unit constantly monitors the sensor signals of the sensor device 43. Seeing that the sensor signals are an indication of the filling density or density or filling degree of the solid or cellulose in the compacting chamber 34, the central control unit, e.g. a programmable computer, can determine when a pre-set, specific initial filling degree or initial density of the solid is present in the compacting chamber 34. The solids feeding device now feeds solid or cellulose continuously to the compacting chamber 34 for so long until the central control unit detects a corresponding pre-set initial filling degree.

Thereupon the central control unit stops the solids feeding device, closes the feed valve 52 or a corresponding shut-off element and instructs the compactor drive unit 42 to perform a compacting stroke, during which the compacting rod 40 and accordingly also the compacting piston 39 can be moved from the position A downwards to compact or press together the solid in the compacting chamber 34, as illustrated in FIG. 7, when the compacting piston assumes, for example, a compacting position B. The compacting phase is again monitored by the central control unit by way of the evaluation of the sensor signals of the sensor device 43. If based on the sensor signals of the sensor device 43 the central control unit determines that during the compacting stroke a pre-set filling degree or pre-set filling density, which is specified, has been reached, the control unit stops the compactor drive unit 42 so as to stop the compacting phase.

Next the central control unit opens the shut-off device 53 whilst at the same time closing the shut-off device 54, and again controls the drive unit 42 for a continuation of the downward movement of the compacting piston 39, so that during, a discharge phase the compacted cellulose is discharged from the compacting chamber 34 into the reaction chamber 50. This is illustrated in FIG. 8, wherein during the discharge phase the compacting piston 39 assumes, for example, the illustrated discharge position C. During the discharge phase the compacted solid is moved essentially without further compacting into the reaction chamber 50 by the compacting piston 39.

When the compacting piston 39 has filled the reaction chamber 50 with solid, the central control unit waits until the compacting piston 39 has again reached its rest position A, which can be monitored, for example, by movement or path sensors on the compacting rod 40. After the compacting piston 39 has again reached its rest position A, the central control unit now by corresponding electric signals and setting devices closes the shut-off device 53, as a result of which the reaction chamber 50 is sealed off hermetically from the compacting chamber 34. The central control unit now lets pressurised liquid ammonia flow through the ammonia inlets 51, by way of corresponding valves and setting elements, into the reaction chamber 50, as a result of which the desired solid/ammonia mixture is produced in the reaction chamber 50 of the pressure reactor 30. Simultaneously with the closing of the shut-off device 53, the central control unit actuates the solids feeding device and opens the feed valve 52, to start another filling phase of the compacting chamber 34. The reaction phase in the reaction chamber 50 and the filling phase of the compacting chamber 34 are, therefore, carried out simultaneously or parallel. At the end of the reaction phase, as explained in more detail above, the shut-off device 54 is opened, as a result of which the ammonia/solid mixture is expanded explosion-like from the reaction chamber 50 into the expansion chamber positioned underneath same.

If during the compacting phase (see FIG. 7) the pre-set compacting degree of the solid is not obtained in the compacting chamber 34, which the central control unit determines by evaluating the sensor signals of the sensor device 43, the compacting piston 39 is moved back to its rest position A or its upper dead point. The down-wards directed compacting stroke is repeated. If notwithstanding repeating the compacting stroke one or several times, none of the pre-set compacting degrees are reached, another filling phase is carried out, as explained in the foregoing with reference to FIG. 6. This intermediate or additional or supplementary filling phase takes place, for example, in such a way that only a relatively small quantity of solid is fed into the compacting chamber 34 by the solids feeding device with the valve 52 open. This small filling material quantity can be realised by the central control unit by a brief or short-phase opening of the valve 52 with the solids feeding device operating without taking into account the sensor signals of the sensor device 43. After the intermediate filling phase the central control unit again starts a compacting phase (see FIG. 7), to obtain the pre-set compacting degree of the filled solid. During the renewed compacting phase, several compacting strokes of the compacting piston 39 can again be carried out until the pre-set compacting degree has been reached and the process can continue with the discharge and reaction phase.

If notwithstanding a supplementary compacting phase the pre-set compacting degree of the solid in the compacting chamber 34 is not reached, the central control unit repeatedly carries out supplementary filling phases and compacting phases until the pre-set compacting degree has been reached, and the process can continue with the aforementioned discharge, reaction and expansion phases.

In the following a solids feeding device with a preparation stage for the solid, i.e. in the present example for the cellulose, is described with reference to FIG. 9.

Figure 9:
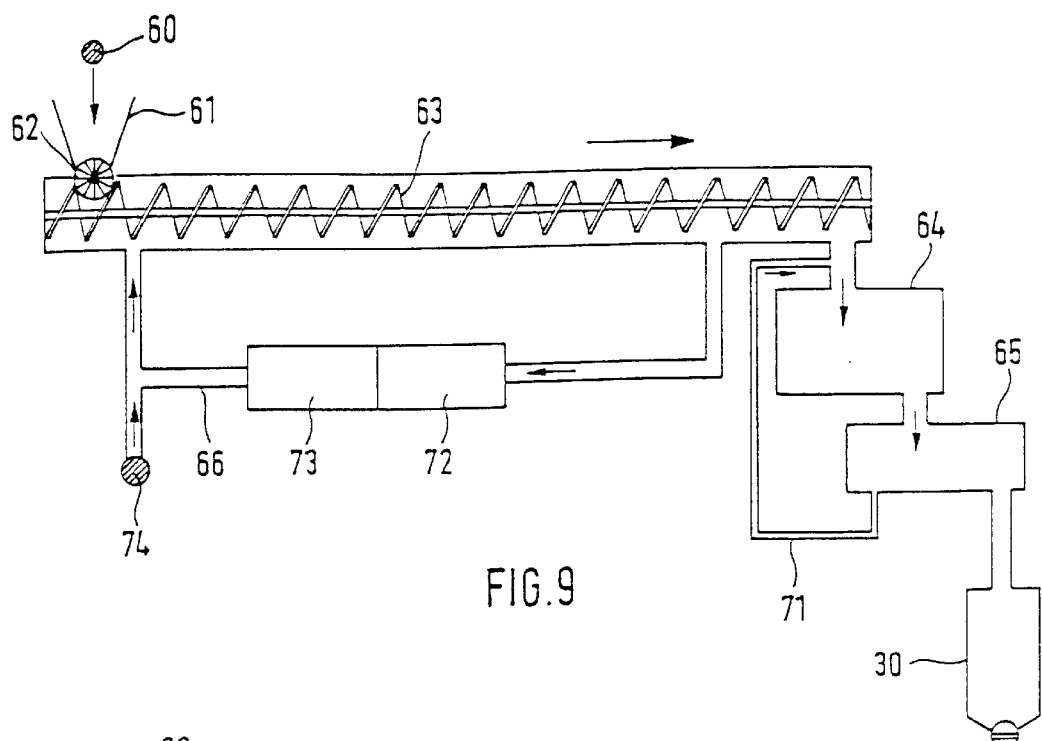
FIG. 9 is a diagrammatic view of a solids preparation and solids feeding device for use in the apparatus according to the invention.

The solids preparation and feeding device illustrated in FIG. 9 comprises essentially a heating stage followed by a comminuting stage, wherein in the heating stage a gas or a liquid is fed to the solid or cellulose, so as to prepare the solid or cellulose for the further processing and to make the cellulose more reactive for the absorption of unheated liquid ammonia in the pressure reactor.

That heating stage comprises a conveying screw 63, which on the inlet side is fed via a cellular wheel sluice 62 with, for example, cellulose or wood chips from a cellulose storage tank 16 by way of a hopper 61, wherein the cellulose is present in a relatively coarse form. The heating stage furthermore comprises a heating device 73 and a pump 72, which are arranged in a heating circuit 66 in which also at least a certain section of the conveying screw 63 is located. The heating circuit 66 is furthermore connected liquid-passable by suitable feeding devices such as pipes, valves etc. to an ammonia storage tank 74, wherein from the ammonia storage tank 74 liquid or gaseous ammonia can be fed into the heating circuit 66. The pump 72 circulates the gaseous or liquid ammonia through the heating circuit 66. The heating device 73 heats the ammonia to a temperature of approximately 100° C., and this is then fed to the cellulose in the conveying screw 63 in order to prepare the cellulose for the further processing. The ammonia gas or a liquid ammonia in the conveying screw 63 acts on the cellulose along a reaction section during a pre-determined reaction time.

The heating stage is followed by the comminuting stage, which consists of comminuters 64, e.g. a shredder or crusher for wood chips, and a subsequent screening unit 65 in which too coarse solid or cellulose is screened out and via a solids feedback 71 is fed back again to the inlet side of the comminuter 64. The as envisaged fine cellulose passes through the screening unit 65 and by a further feeding or further solids feeding device, as explained further down, can then be fed to the pressure reactor 30 or distributed over a pressure reactor group which consists of several pressure reactors 30.

By the preparation in the heating stage the solid or cellulose is made more reactive for the later absorption of liquid ammonia in the pressure reactor 30, as a result of which the dwell time or cycle time during the reaction phase of the cellulose and ammonia in the pressure reactor can be reduced and accordingly the yield in the overall process can be increased. By the further comminuting of the solid or cellulose followed by a screening in the comminuting stage, a cellulose with improved homogeneity and greater reaction surface can be made available to the pressure reactor 30, as a result of which the reaction phase in the pressure reactor can be reduced further and accordingly the yield of the overall process is increased or the cycle times of the quasi-continuous production process of the invention can be shortened.

Figure 10:
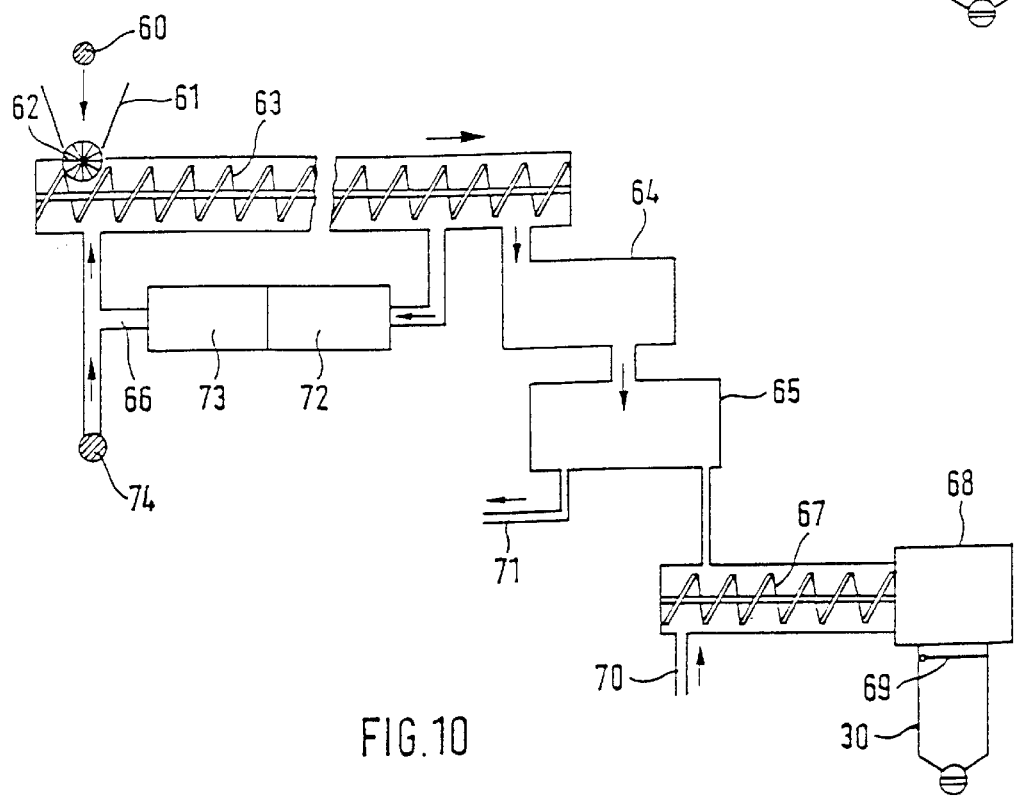
FIG. 10 is a diagrammatic view of an alternative solids preparation and solids feeding device for use in the apparatus according to the invention.

In FIG. 10 a supplemented or alternative embodiment of the solids preparation and comminuting unit of FIG. 9 is again diagrammatically illustrated. Identical parts and devices of the preparation stage of FIG. 10, as are also used in the embodiment of the FIG. 9, have been given the same reference numerals in FIG. 10 and will, therefore, not be explained in more detail in the following.

Unlike the embodiment of FIG. 9, the preparation device of FIG. 10 has an additional heating stage, followed by an additional comminuting stage, wherein the additional heating stage and additional comminuting stage follow in this order the outlet side of the screening unit 65.

The additional heating stage again comprises essentially a conveying screw 67 and an ammonia feeding device 70 which feeds pre-heated liquid ammonia to the conveying screw 67, which in the conveying screw 67 during a reaction time and over a conveying section again acts on the cellulose or solid which is being conveyed by the conveying screw 67.

The additional heating stage is followed by the additional comminuting stage 68, which consists essentially of, for example, a further comminuter, which may be, for example, a cold comminuter 68 (obtainable for example from the company Fryma, Switzerland) and which further comminutes the cellulose fed in on the inlet side, and feeds it to the solids feeding device or a transport system or directly through a shut-off device, e.g. a slide valve or flap valve 69, to the pressure reactor 30. The additional comminuting ensures a further size homogenising of the cellulose and increases the reaction surface.

Figure 12:
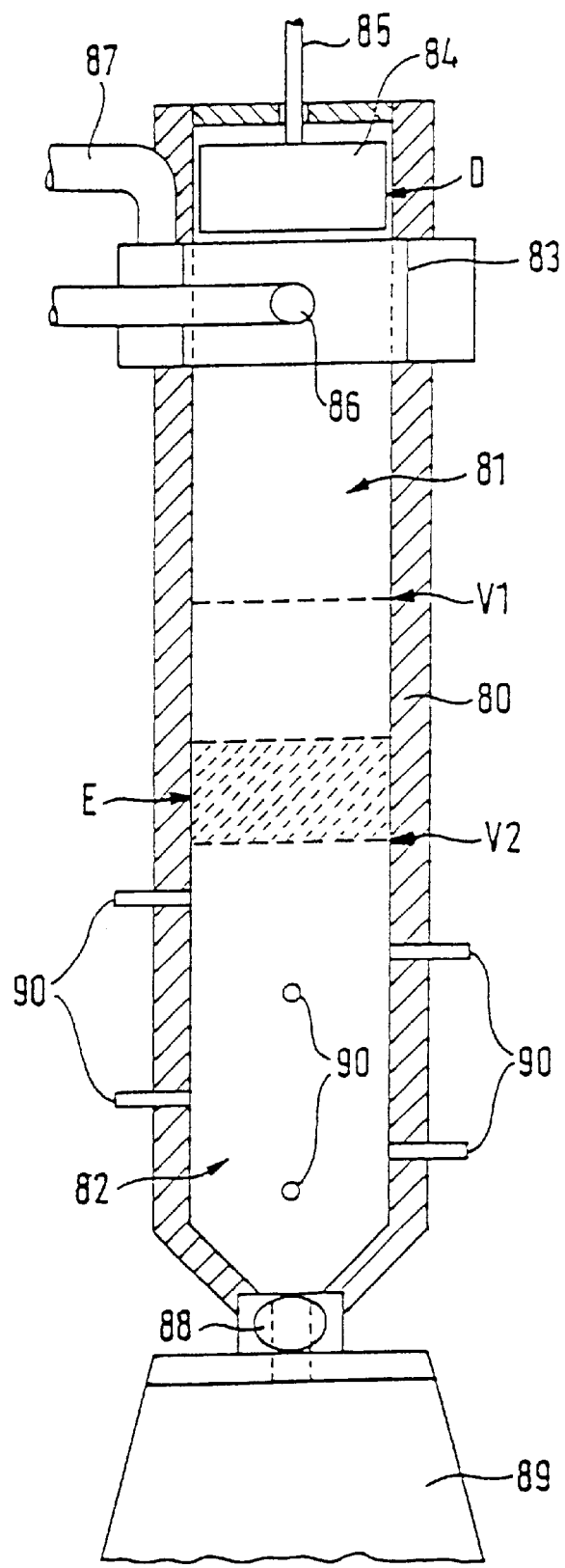
FIG. 12 is a diagrammatic view of a second embodiment of the pressure reactor according to the invention for use in the apparatus according to the invention.

FIG. 12 illustrates diagrammatically another embodiment of a pressure reactor 80 according to the invention for use in the apparatus according to the invention.

The pressure reactor 80 consists of an upright or vertically arranged pressure reactor housing with cylindrical cross-section, which is closed at the top and at the bottom, i.e. towards the expansion chamber 89, is provided with a shut-off device 88, e.g. a ball valve, which when open provides a through-connection between a reactor chamber 81 or the inside of the pressure reactor 80 and the expansion chamber 89 and when closed seals off the inside of the pressure reactor 80 from the expansion chamber 89.

The inside of the pressure reactor 80 is made with one chamber, i.e. the reactor chamber 81. The pressure reactor 80 furthermore comprises a compacting device and a separating device, which separates the solid or cellulose or cellulose particles fed by a continuously operating feeding device from a conveying means, e.g. air or nitrogen.

The compacting device comprises a compacting piston 84, a piston rod 85 which act on an upper side of the compacting piston 84, and a drive unit (see for example 98 in FIG. 14) which is coupled to the piston rod 85 in order to move the compacting piston 84 up and down inside the reactor chamber 81 and to execute corresponding compacting strokes. The compacting piston 84, with regard to circumference, fits into the inside diameter of the reactor chamber 81 of the pressure reactor 80, when looking at the cross-section of the pressure reactor 80. The drive unit of the compacting piston 84 may again, for example, be pneumatic. The solids feeding device is, for example, made pneumatic and as conveying means compressed air is therefore used.

The separating device is designed as a cyclone 83, to which on the inlet side via a solids inlet 86 the supplied solid with conveying means is fed and from which on the outlet side through a conveying means outlet 87 the conveying means is again removed. A section of the reactor chamber 81 acts as whirling chamber for the cyclone 83.

In the bottom part of the reactor chamber 81 several ammonia inlets 90 are provided, offset relative to one another with regard to height and radially. The bottom part of the reactor chamber 81 acts as reaction area 82, in which the supplied solid or cellulose is charged with liquid ammonia to form the cellulose/ammonia mixture. Again provided on the pressure reactor 80 is a sensor device, which determines the filling level and compacting degree of the solid in the reaction chamber 81 and is connected to a control unit for the pressure reactor 80, which controls and monitors all filling, compacting, reaction and closing and opening operations on the pressure reactor 80.

The method of operation of the pressure reactor 80 according to FIG. 12 will be explained in the following During a filling phase of the pressure reactor 80, the compacting piston 84 is in its uppermost position, i.e. its rest position D, the reactor chamber 81 of the pressure tank 80 is filled with the solid via the feeding device and the cyclone 83, wherein the conveying means is drawn off through the conveying means outlet 87.

When a pre-set filling level of cellulose in the reaction chamber 81 has been reached, which is monitored by a sensor device (see 43 in FIG. 5) and the central control unit, the control unit starts up a compacting phase. During the compacting phase the compacting piston 84, driven by a pneumatic drive unit via the piston rod 85, performs a downwards directed compacting stroke or several successive compacting strokes until a pre-set compacting degree of the cellulose in the reaction chamber 81 has been reached, which is again monitored and controlled by means of the sensor device of the control unit. When the pre-set compacting degree of the cellulose has been reached, the compacting piston 84 remains in the extended position, i.e. the end position E, of the last compacting stroke. The cellulose in the reactor chamber 81 then has reached, for example, the filling level or associated volume V2, as can be noted from FIG. 12. The length of the compacting stroke of the compacting piston 84 can be adjusted, as a result of which different volumes, e.g. also V1, can be realised. reaction area 82 inside the reactor chamber 81 is then delimited by the compacting piston 84 in position E, by the cylindrical wall of the reactor housing and by the closed shut-off device 88, wherein the volume of the reaction area 82 corresponds to the volume which the compacted cellulose or solid now occupies.

Next the central control unit starts the reaction phase, during which pressurised liquid ammonia is fed into the solid or cellulose in the reaction area 82 through the ammonia inlets 90. On completion of the reaction phase or the associated reaction time, the control unit opens the shut-off device 88 and the intended explosion-like explosion of the cellulose/ammonia mixture now present in the reaction area into the expansion chamber 89 takes place.

Then the central control unit again closes the shut-off device 88 and the compacting piston 84 is pulled back into its rest position D (return phase), whereupon a new cycle of filling phase, compacting phase, reaction phase and expansion phase is carried out.

With this embodiment the compacting piston 84 itself has the function to delimit or close off the reaction area 82 without an additional shut-off device being required.

Figure 11:
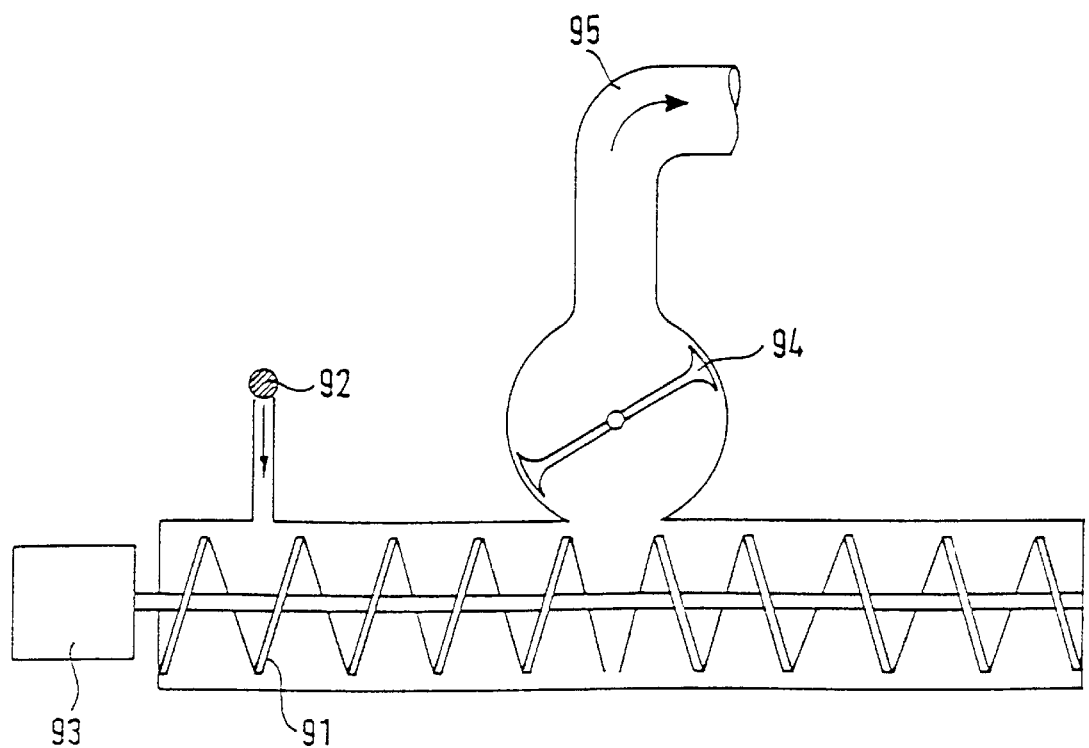
FIG. 11 is a diagrammatic view of a feeding device for use in the apparatus according to the invention.

FIG. 11 illustrates diagrammatically an example of a feeding device that can be used for an apparatus according to the invention. The illustrated feeding device comprises essentially a conveying screw 91, which is coupled to an associated drive 93, and a conveying propeller 94, which on the inlet side is connected to the conveying screw area and on the outlet side material-passable to a distribution system 95.

The conveying screw has a left threaded section and a right threaded section and is connected to a solids storage tank 92, from which the conveying screw 91 conveys the solid, e.g. cellulose. In the area where the left and right threaded sections of the conveying screw 91 adjoin one another, the conveying propeller 94 joins up to take hold of the solid fed by the conveying screw 91 and feeds it to the distribution system 95, which finally feeds the accelerated solid to one or several pressure reactors. The solids feeding device illustrated in FIG. 11 feeds the solid to the pressure reactors continuously.

As an alternative to the conveying propeller 94, a pressure gas pipe may join up with the conveying screw 91, which feeds a pressurised gas, e.g. compressed air, nitrogen, to the conveying screw 91 to permit a continuous feeding of the solid to the distribution system from the conveying screw 91. The pressurised gas then acts as propellant gas and as conveying means for the solid in the distribution system 95 to the pressure reactor.

Figure 13:
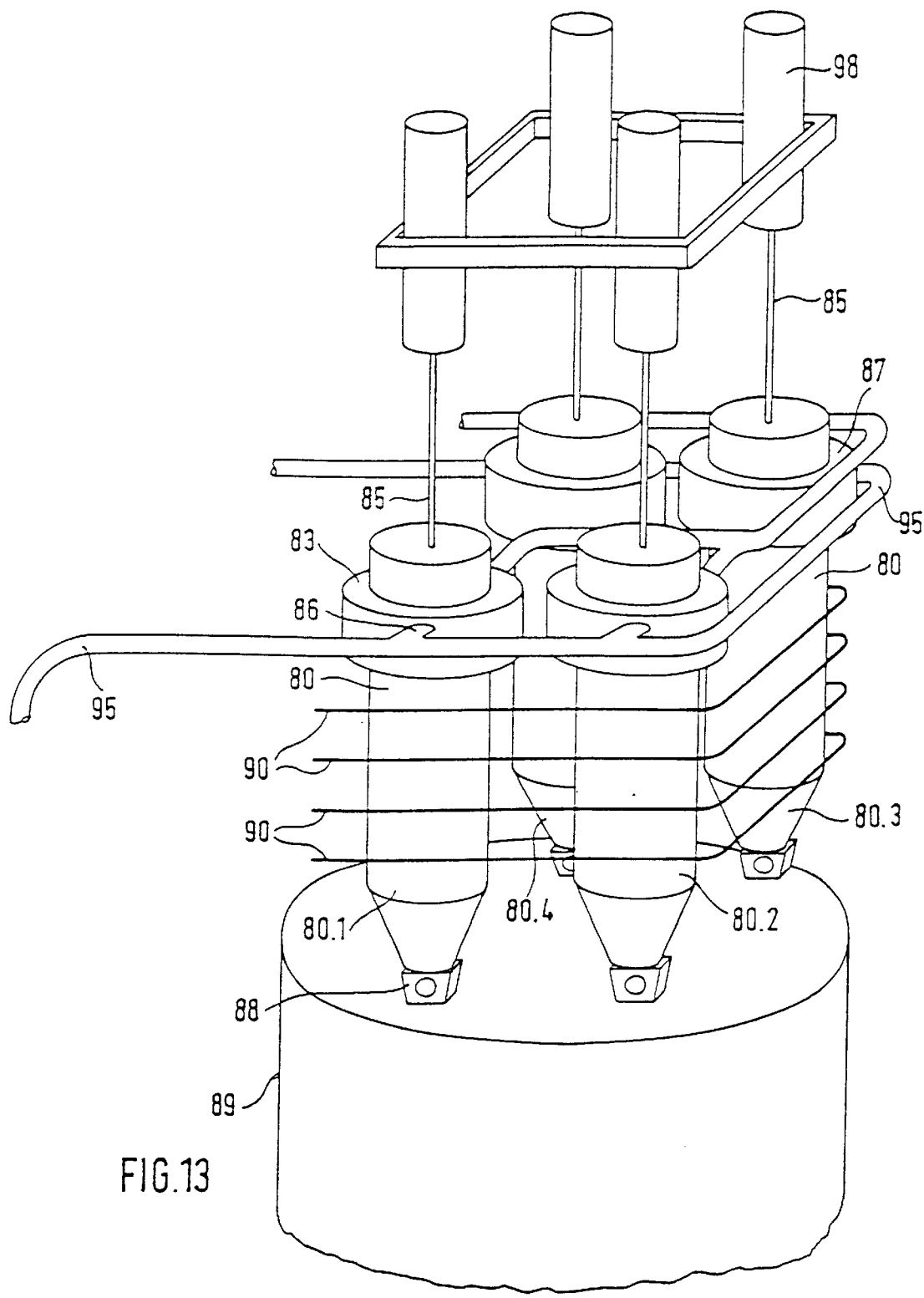
FIG. 13 is a diagrammatic and perspective view of a pressure reactor group with four pressure reactors according to FIG. 12 for use in the apparatus according to the invention.
Figure 14:
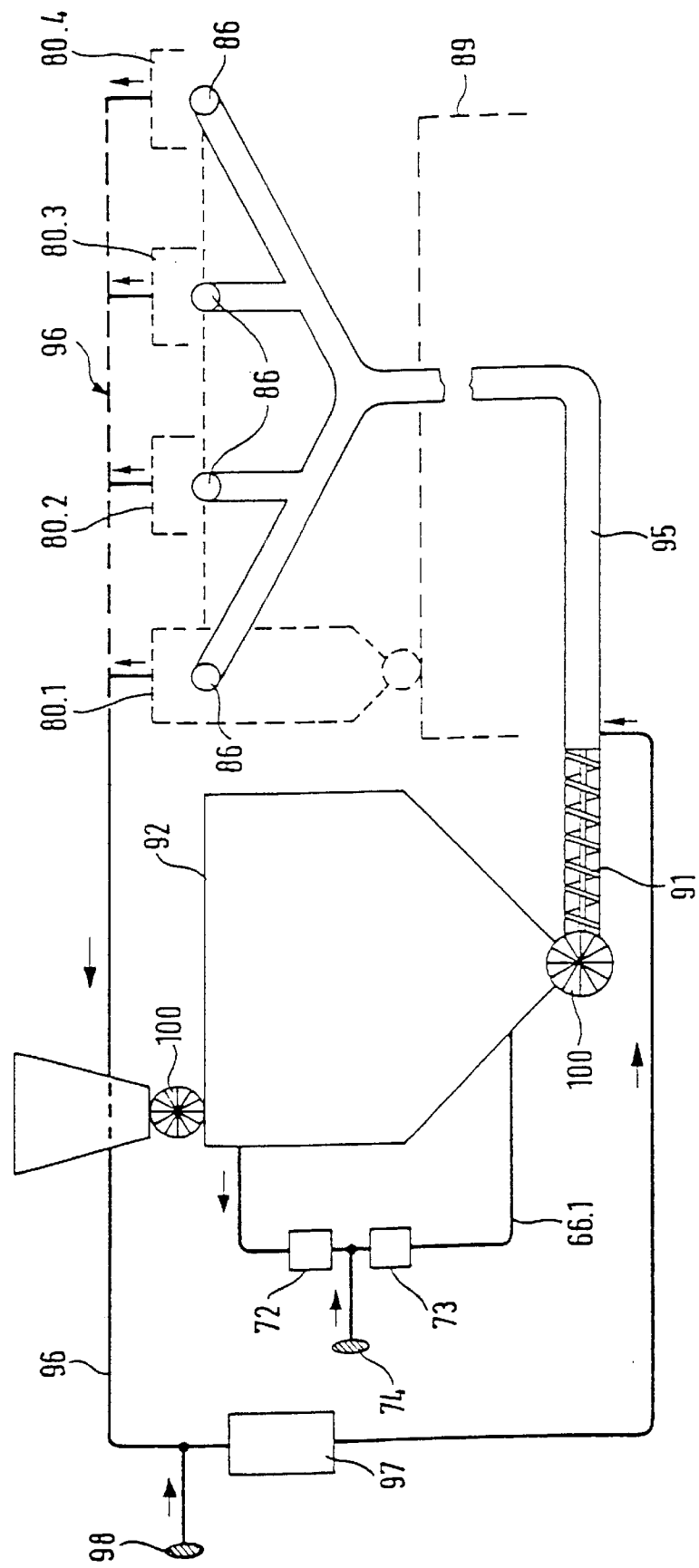
FIG. 14 is a diagrammatic overall view of an apparatus according to the invention with the pressure reactor group according to FIG. 13.

FIG. 13 illustrates by way of example a pressure reactor group, which comprises four identical pressure reactors 80.1, 80.2, 80.3 and 80.4 of the type illustrated in FIG. 12, wherein per pressure reactor a pneumatic cylinder 98 is shown for driving the respective compacting piston 84 by way of the piston rod 85. The cyclones 83 of the pressure reactors 80.1 to 80.4 are connected to the distribution system 95 of a solids feeding device (see 91, 92, 95, 100 of FIG. 14), wherein the conveying means outlets 87 of the cyclones 83 open out into a common conveying means feedback device 96, as illustrated in FIG. 14. The ammonia inlets 90 of the individual pressure reactors 80.1 to 80.4 are connected by a piping system shown in FIG. 13 to an ammonia source for pressurised liquid ammonia.

By a central control unit, e.g. a SPS control unit which by means of a programme controls the pressure reactor group illustrated in FIG. 13 and all circuits illustrated in FIG. 14 and a solids or cellulose preparation and feeding device, the individual pressure reactors 80.1 to 80.4 are operated and controlled either individually or in groups, e.g. in groups of two, in a staggered manner so as to obtain a quasi-continuous overall production process. Thus, for example, the filling and compacting phases can be carried out in the two pressure reactors 80.1 and 80.2, whilst in the two rear pressure reactors 80.3 and 80.4 the reaction and expansion phases are carried out.

The operation of the pressure reactor group can, however, also take place in staggered phases, as will be explained in the following. In the starting state the pressure reactors in question are filled for the first time in staggered phases.

When the steady state has been reached, in a first step the filling phase is carried out for example in pressure reactor 80.1, whilst simultaneously in pressure reactor 80.2 the compacting phase, in pressure reactor 80.3 the reaction phase and in pressure reactor 80.4 the expansion phase and return phase of the compacting piston 84 are carried out. During the next, second step, simultaneously with one another, corresponding to the pressure reactor phases of a pressure reactor cycle explained with reference to FIG. 12, in the pressure reactor 80.1 the compacting phase, in pressure reactor 80.2 the reaction phase, in pressure reactor 80.3 the expansion and return phase and in pressure reactor 80.4 the filling phase is carried out. In the third step or next cycle, again simultaneously with one another, in the pressure reactor 80.1 the reaction phase, in pressure reactor 80.2 the expansion and return phase, in pressure reactor 80.3 the fillings phase and in pressure reactor 80.4 the compacting phase is carried out. Then, in the next fourth step simultaneously in the pressure reactor 80.1 the expansion and return phase, in pressure reactor 80.2 the filling phase, in pressure reactor 80.3 the compacting phase and in pressure reactor 80.4 the reaction phase is carried out.

With this a four-step, phase staggered overall cycle for the pressure reactor group illustrated in FIG. 13 has been completed and the next overall cycle of the steady state pressure reactor group continues. In the starting state the pressure reactors in question are filled for the first time in a phase-staggered manner.

FIG. 14 illustrates the supply system for FIG. 13, which comprises a supply with the solid, a conveying means circuits 96 and a heating agent circuit 66.1.

The solids supply comprises a storage tank (silo) 92, to which on the inlet side via a cellular wheel sluice 100, a solid, e.g. cellulose is fed as torn pulp or ground pulp, and from which on the outlet side, via another cellular wheel sluice 100, the cellulose prepared in the silo 92 is removed. The cellular wheel sluice 100 transfers the cellulose from the silo 92 to the conveying screw 91 (see for example FIG. 13), at the outlet of which compressed air as propellant gas and conveying means is fed from the conveying means circuit 96 to the cellulose conveyed by the conveying screw 91, as a result of which the cellulose is conveyed in the distribution system 95 to the pressure reactors 80.1 to 80.4. The conveying means outlets 87 of the cyclones 83 of the pressure reactors are connected liquid-passable to a conveying means feedback device 96 of the conveying means circuit, wherein the conveying means feedback device 96 feeds the returned conveying means to a compressor unit 97 which again compresses the compressed air and, as mentioned, feeds it into the distribution system 95 for conveying the cellulose. In the conveying means feedback device a filter unit may be used to filter solid particles out of the returned conveying means or propellant gas flow. To compensate conveying means losses, a conveying means storage tank 98 is connected to the conveying means circuit.

For the preparation the cellulose or solid in the silo 92 is charged with liquid or gaseous ammonia in a heating circuit 66.1, wherein in the heating circuit 66.1 a pump 72, which maintains the circuit feedback and the feeding of the ammonia into the silo 92, and a heating device 73 which heats the gaseous or liquid ammonia to, for example, 100° C., are provided. The relatively large volume of the silo 92 ensures that a desired preparation reaction or a desired acting of the heated ammonia on the cellulose is ensured in the silo 92 before the solid is removed from the silo 92. Also connected to the heating circuit 66.1 is an ammonia source 74, which is used to compensate ammonia losses in the heating circuit.

What is claimed is:

1. Pressure reactor for the treatment of a solid, with a pressurized gas as a liquid, a compacting device which presses together the solid filled into the pressure reactor to compact it, the reactor comprising a compacting piston which moves in a reactor chamber and compresses the solid, the compacting piston being holdable and/or lockable in a position of its maximum piston stroke.

2. Pressure reactor according to claim 1, wherein the compacting piston moves in a cylindrical reactor chamber and compresses the solid.

3. Pressure reactor according to claim 2, wherein the compacting piston has one or several ducts which extend from an underside to an upper side of the compacting piston to pass liquid.

4. Pressure reactor according to claim 1, wherein the reactor chamber comprises a compacting chamber and a reaction chamber which can be separated from one another by a shut-off device, wherein in the compacting chamber the solid is compacted and in the reaction chamber the pressurized liquid ammonia, is fed in while the shut-off device is closed.

5. Pressure reactor according to claim 4, wherein the compacting piston moves the compacted solid from the compacting chamber into the reaction chamber with the shut-off device open.

6. Pressure reactor according to claim 1, further comprising a conveying means, in particular propellant gas or compressed air, for feeding the solid into the reactor chamber and removing the solid from the reactor chamber.

7. Pressure reactor according to claim 6, further comprising a cyclone for the pressure reactor, to which on the inlet the solid can be fed in by a conveying means and which on the outlet side feeds the solid into the reactor chamber and the conveying means to a conveying means outlet.

8. Pressure reactor according to claim 1, wherein the compacting piston in the position in which it is held and/or locked, delimits a reaction area of the reactor chamber.

9. Pressure reactor according to claim 1, further comprising a sensor device to determine a filling level of the solid in the pressure reactor and/or a compacting degree or density of the solid in the pressure reactor.

10. Apparatus for the treatment of solids comprising:
   at least two parallel arranged pressure reactors;
   control means for operating the pressure reactors in a time-staggered manner for the alternating taking in of a solid and a liquid gas, wherein each pressure reactor has inlet and outlet openings for the solid provided with shut-off elements and at least one inlet opening for the liquid gas, wherein a said pressure reactor comprises a compacting device to press together the solid including a piston that can be locked in a position of its maximum piston stroke;
   at least one expansion tank which is connected to the respective pressure reactors; and
   conveying means for feeding the solid as well as the liquid gas.

11. Apparatus according to claim 10, wherein the shut-off elements of the pressure reactors are ball valves.

12. Apparatus according to claim 10, wherein the pressure reactors are vertical upright tubular cylinders.

13. Apparatus according to claim 10 wherein the conveying means for the solid comprise conveying screws.

14. Apparatus according to claim 10 wherein the conveying means for the solid comprise pneumatic conveyors.

15. Apparatus according to claim 10 further comprising means to control the feeding in of the solid and/or of the liquid gas.

16. Apparatus according to claim 10, further comprising means to cyclically control the operation of the shut-off elements of the pressure reactors.

17. Apparatus according to claim 10, wherein the pressure reactors are equipped with external heating means.

18. Apparatus according to claim 10, wherein the pressure reactors each have several inlet openings for the liquid gas.

19. Apparatus according to claim 10, wherein the pressure reactors are designed as mixers.

20. Apparatus according to claim 10, wherein the shut-off element at the inlet of each pressure reactor comprises a sluice system.

21. Apparatus according to claim 10, wherein the compacting piston moves in a cylindrical reactor chamber.

22. Apparatus according to claim 21, wherein the compacting piston has at least one duct through which liquid-passes from an underside to an upper side of the compacting piston.

23. Apparatus according to claim 10, wherein the reactor chamber comprises a compacting chamber and a reaction chamber which can be separated from one another by a shut-off device, wherein in the compacting chamber the solid is compacted and in the reaction chamber the pressurized liquid gas is fed in while the shut-off device is closed.

24. Apparatus according to claim 23 wherein the compacting piston moves the compacted solid from the compacting chamber into the reaction chamber with the shut-off device open.

25. Apparatus according to claim 21, further comprising a conveying means of propellant gas or compressed air, for feeding the solid into the reactor chamber.

26. Apparatus according to claim 25, further comprising a cyclone to which on the inlet of the pressure reactor the solid can be fed in by a conveying means and which on the outlet side feeds the solid into the reactor and the conveying means to a conveying means outlet.

27. Apparatus according to claim 10, wherein the compacting piston in the locked position delimits a reaction area of the reactor chamber.

28. Apparatus according to claim 10, further comprising a solids feeding device which feeds the solid to a pressure reactor or a group of pressure reactors, wherein the solids feeding device has a conveying propeller.

29. Apparatus according to claim 10, further comprising a preparation device for the solid, which prepares the solid before it is fed to a pressure reactor.

30. Apparatus according to claim 29, wherein the preparation device has a heating device which heats the solid.

31. Apparatus according to claim 30, wherein the heating device heats a heat carrier fluid to be fed to the solid.

32. Apparatus according to claim 31, wherein the heat carrier fluid is liquid or gaseous ammonia.

33. Apparatus according to claim 31, wherein the heating device heats the heat carrier fluid to a temperature of about 100° C.

34. Apparatus according to claim 31, wherein the heat carrier fluid circulates in a heating circuit.

35. Apparatus according to claim 30, further comprising a conveying screw for conveying the solid, wherein the solid is heated in the conveying screw.

36. Apparatus according to claim 31, further comprising a silo for the solid, wherein the solid is heated in the silo.

37. Apparatus according to claim 10, further comprising a comminuting device for the solid.

38. Apparatus according to claim 10, further comprising a screening device for the solid.

39. Process for the treatment of solids with pressurized liquid gas comprising the steps of;

feeding the solid to be treated into a pressure reactor at atmospheric pressure;

during a reaction phase feeding pressurized liquid gas to the pressure reactor;

compacting the solid in the pressure reactor using a compacting piston that can be locked in a position of its maximum piston stroke to compress the solid;

expanding the resultant liquid gas/solid mixture into an expansion tank; and operating at least two reactors in a time-staggered manner.

40. Process according to claim 39, further comprising the step of recovering the gas released during the expanding step.

41. Process according to claim 39, wherein the feeding of the solid into the pressure reactor is accomplished with the aid of dosing screws.

42. Process according to claim 39, wherein the feeding of the solid into the pressure reactor is by a pneumatically operating conveying device.

43. Process according to claim 39, further comprising the step of actively mixing the solid to be treated with the liquid gas in the pressure reactor.

44. Process according to claim 39, further comprising the step of opening and closing the pressure reactor by automatic control.

45. Process according to claim 39, wherein the feeding in of the solid and/or of the liquid gas is controlled automatically.

46. Process according to claim 39, further comprising dissolving or dispersing with the pressurized gas a solid or liquid additive as the gas is fed into the pressure reactor.

47. Process according to claim 46, wherein the liquid gas is mixed with the solid or liquid additive before it enters the pressure reactor.

48. Process according to claim 39, wherein said pressure reactor is charged with a solid during a filling phase, subsequently during a compacting phase the solid is compacted in the pressure reactor, then during a reaction phase liquid gas is fed into the compacted solid in the pressure reactor, by which a liquid/solid mixture is produced, and then the liquid/solid mixture is expanded into an expansion tank.

49. Process according to claim 48, wherein before the reaction phase, the filling phase and the subsequent compacting phase of the solid in the pressure reactor are repeated until a pre-set compacting degree and/or filling level of the solid in the pressure reactor is obtained.

50. Process according to claim 48, wherein during the compacting phase a compacting stroke or several successive compacting strokes of the compacting piston are executed.

51. Process according to claim 48, wherein several pressure reactors are operated simultaneously, staggered in the aforementioned phases.

52. Process for the treatment of a solid comprising the steps:

charging a pressure reactor with solid cellulose during a filling phase, subsequently compacting the solid cellulose in the pressure reactor, feeding liquid pressurized ammonia gas into the compacted solid in the pressure reactor to react with the solid cellulose, by which a liquid-solid mixture is produced;

expanding the liquid/solid mixture into an expansion tank, wherein the steps are performed in several pressure reactors being operated simultaneously or staggered in several of the aforementioned steps.

53. Process according to claim 52, wherein before the steps of feeding, charging and compacting are repeated once or several times until a pre-set compacting degree and/or filling level of the solid in the pressure reactor is obtained.

54. Process according to claim 52 wherein during the compacting step a compacting stroke or several successive compacting strokes of a compacting piston of the pressure reactor are executed.

* * * * *